Figures 1, 5, 6:
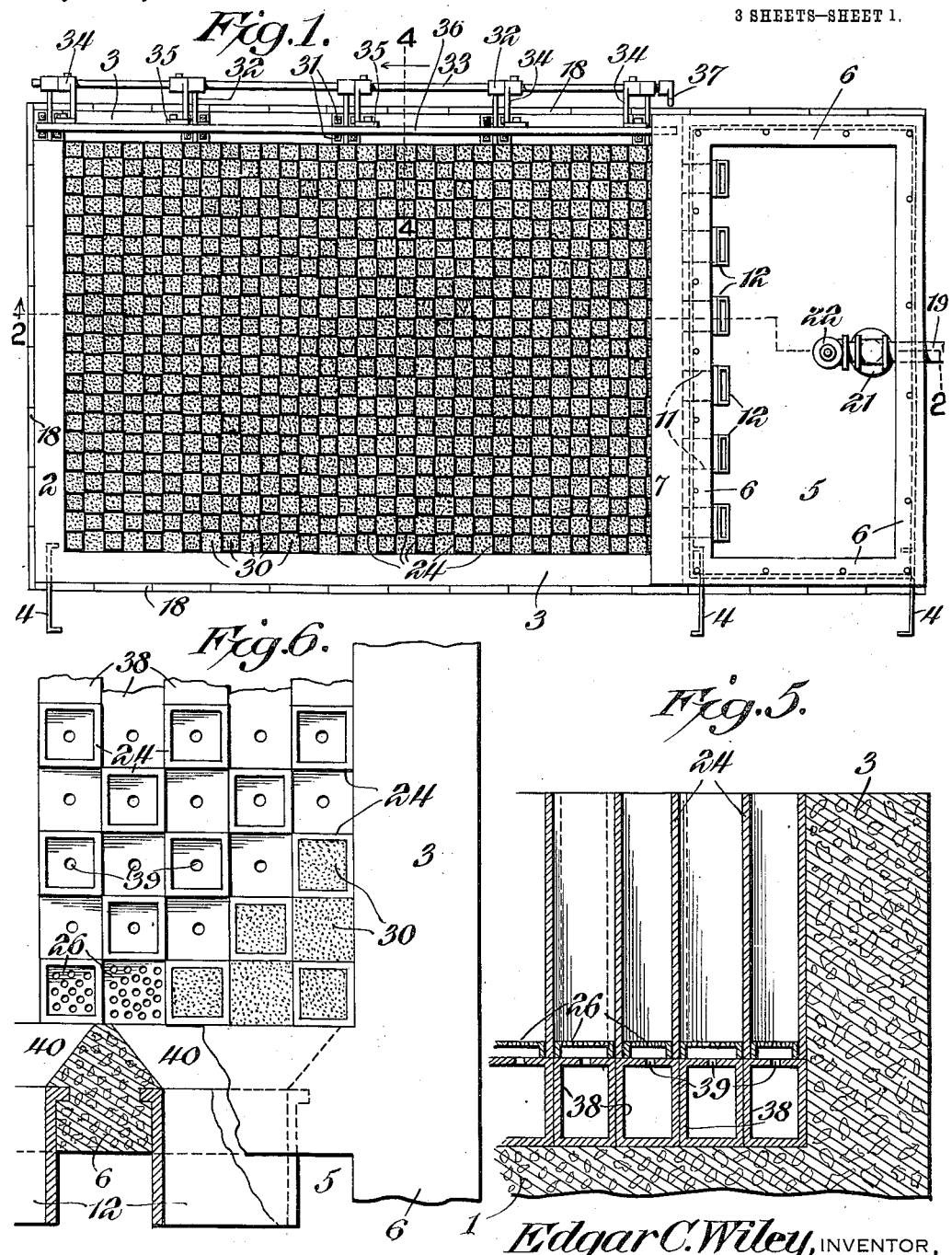

E. C. WILEY.
FILTER PLANT.
APPLICATION FILED OCT. 2, 1912.

1,060,870. Patented May 6, 1913.
3 SHEETS—SHEET 1.

WITNESSES
Howard D. Orr.
F. T. Chapman.

Edgar C. Wiley, INVENTOR,
BY
ATTORNEY

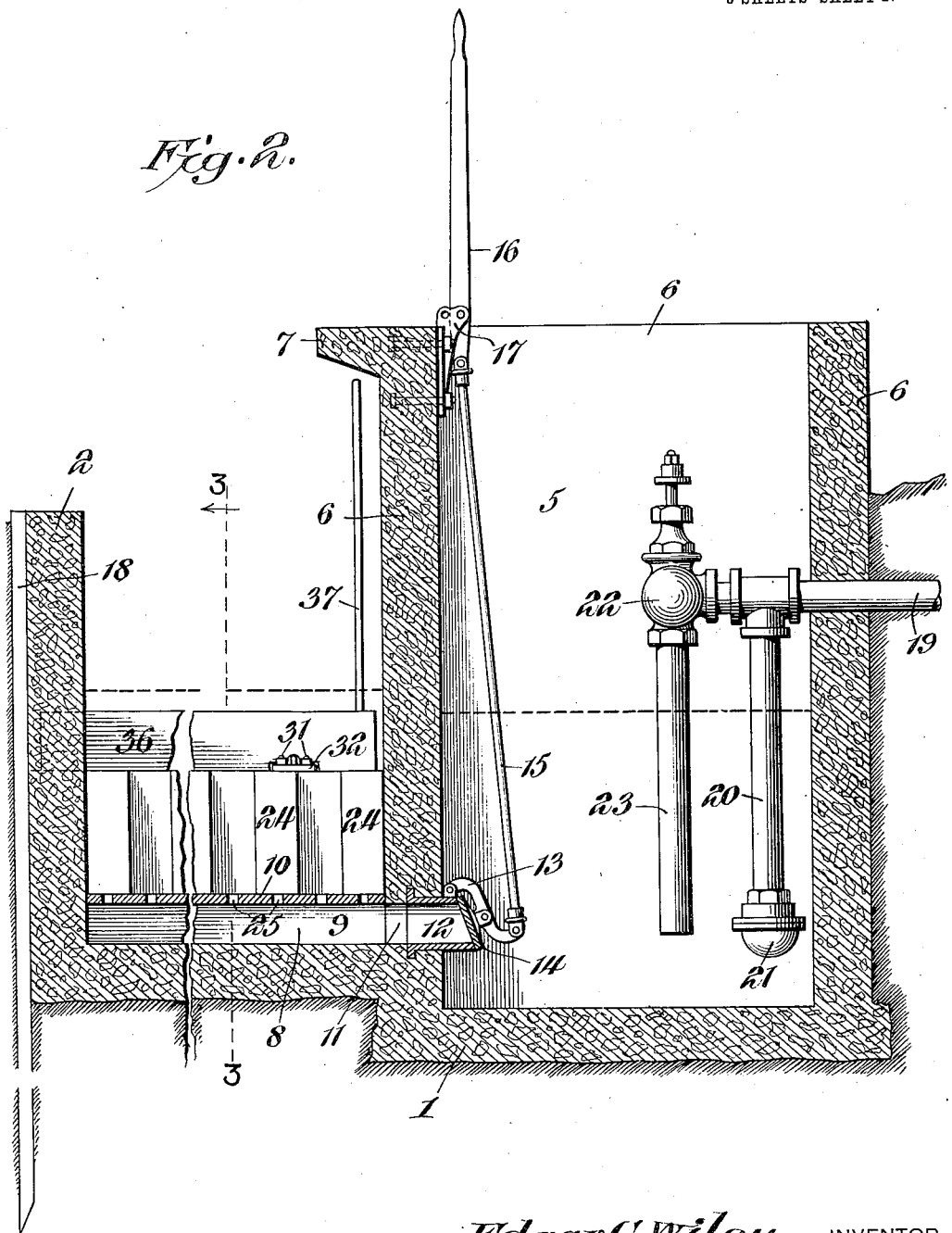

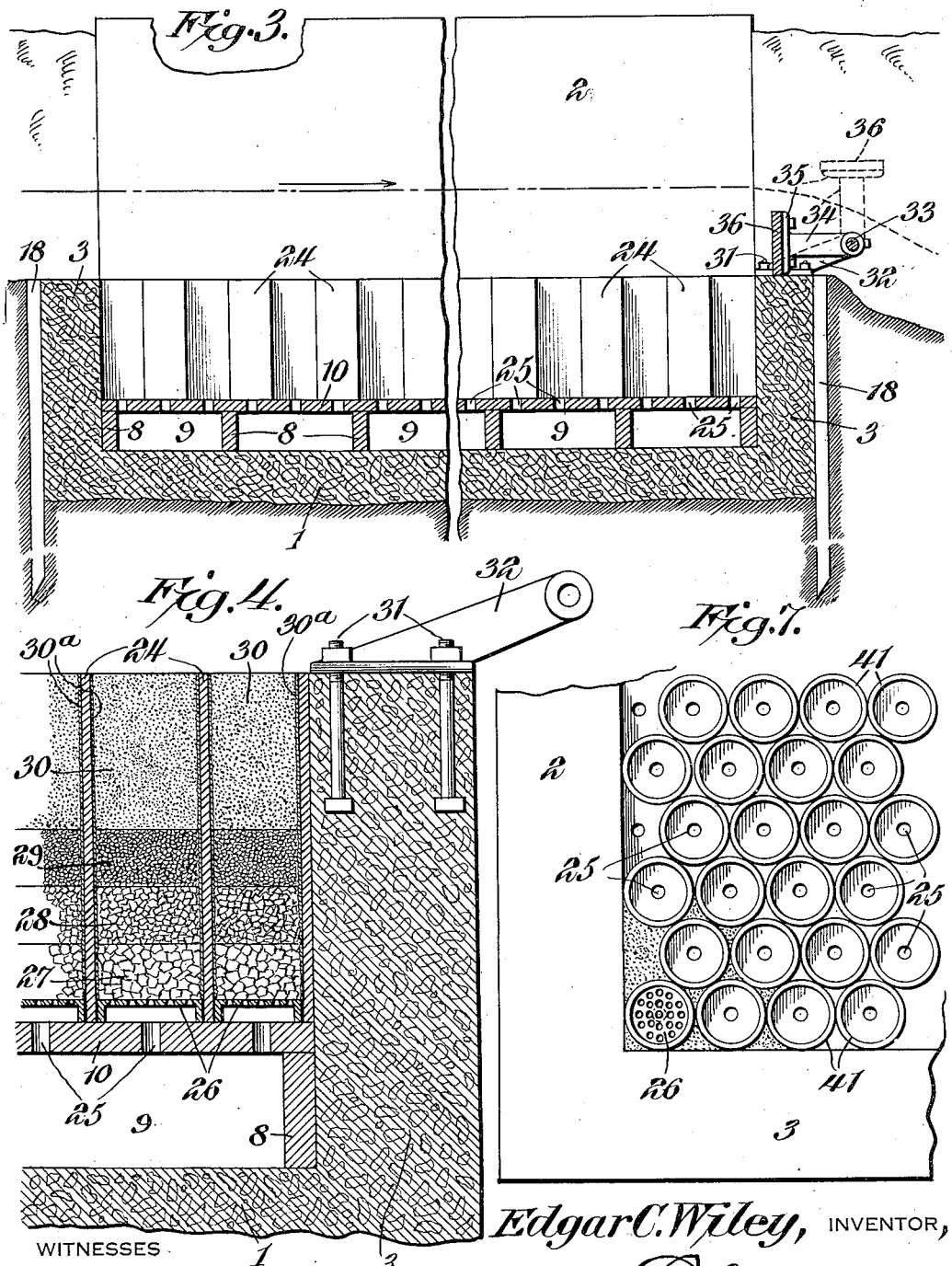

UNITED STATES PATENT OFFICE.

EDGAR CLARENCE WILEY, OF LYNCHBURG, VIRGINIA.

FILTER PLANT.

1,060,870.  Specification of Letters Patent.  Patented May 6, 1913.

Application filed October 2, 1912. Serial No. 723,619.

*To all whom it may concern:*

Be it known that I, EDGAR C. WILEY, a citizen of the United States, residing at Lynchburg, in the county of Campbell and State of Virginia, have invented a new and useful Filter Plant, of which the following is a specification.

This invention has reference to improvements in filter plants or infiltration systems designed especially for the filtering of water as it is taken from running streams primarily to remove sand, mud, and other objectionable matter which is liable to obstruct the suction intakes of pumping plants and damage the pumping machinery, this being more especially the case during extraordinary conditions, as, for instance, during freshets and the like. By a proper choice of filtering material and depth of filtering bed, the arrangement is capable of clarifying or purifying water to a greater or less extent in accordance with the practice followed in other rapid sand filters.

While the system is especially suitable for purifying city water supplies and supplies for industrial plants and railway water stations taken from running streams, it may be also employed where the filter plants are installed at points remote from the streams or in public buildings or private houses.

In accordance with the present invention the filtering bed is, in the case of running streams, sunk into the bed of the stream until its upper surface is approximately level with the bottom or bed of the stream and has filtering units which discharge into ducts at a still lower level, and these ducts in turn lead into a well having walls extending to a sufficient height to come well above high water line, so that this well will not be filled up with trash or other obstructions during freshets. Each filter bed may comprise a number of ducts opening individually into the well and each opening may be controlled by a suitable gate or door in turn controlled by operating mechanism at the top of the well. Furthermore, each filter unit communicates with the underlying collecting duct through a small hole for a purpose which will hereinafter appear, and in order that a suitable depth of water may be maintained over the filter bed under low water conditions in the stream, a gate or tail board is installed at the down-stream end of the filter bed, but provision is made for moving this gate or tail board to inactive position when desirable.

The invention will be best understood from a consideration of the following detailed description, taken in connection with the accompanying drawings forming a part of this specification, with the further understanding that while in the drawings practical embodiments of the invention are illustrated, the invention is susceptible of other practical embodiments, wherefore it is not confined to any exact conformity with the showing of the drawings, but the practical embodiment may be changed and modified so long as such changes and modifications mark no material departure from the salient features of the invention.

In the drawings: Figure 1 is a plan view of a filter structure embodying the present invention. Fig. 2 is a section on the line 2—2 of Fig. 1, but drawn to a larger scale. Fig. 3 is a section on the line 3—3 of Fig. 2 but omitting distant parts. Fig. 4 is a section on the line 4—4 of Fig. 1, but drawn to a larger scale. Fig. 5 is a section similar to Fig. 4 but showing a somewhat modified construction. Fig. 6 is a plan view of the structure of Fig. 5 showing some of the lower parts in section. Fig. 7 is a detailed plan view showing a somewhat different form of filtering units from those illustrated in the other figures.

When the filter plant is installed in a running stream, the latter may be diverted and an excavation is made in the bottom of the stream to a suitable depth, and in the bottom of this excavation there is laid a bed 1 of suitable material, such as cement concrete, and retaining walls 2, 3 are built up about the marginal portions of the excavation to serve as retaining walls for parts to be described, but the up stream and down stream retaining walls are carried only to a height where they will be approximately level with the bed of the stream. The wall 2 may be carried higher than the walls 3 and may constitute one shore wall of the filter bed structure in narrow streams, while in wide streams the filter plant may be of less width than that of the stream and suitable means, such as a wing wall or low dam be provided for causing a suitable quantity of water to traverse the filter plant even under low water conditions. Embedded in the wall 2 at one or both ends there may be provided tie rods

4 for uniting other filter beds to the one already built should this become desirable at some future time.

At the end of the walls 3 remote from the wall 2 a well 5 is produced with walls 6 rising above the other walls to a height above the high water level of the stream even in times of freshet, so that no deleterious matter from the stream may find direct access to the well and the latter may not become choked with any trash carried by the stream. That wall 6 of the well facing the wall 2 may be provided with an overhang 7 and the bottom of the well may be sunk to a lower level than that portion of the bed underlying the space between the wall 2 and the well 6.

In one form of the invention suitably spaced sills 8 are lodged between the walls 2, 3 and 6 and extend from the wall 2 to the well, thus providing a suitable number of compartments or chambers 9. Laid on these sills is a floor 10 which together with the sills may be made of wood, but other material may be employed, and one such arrangement is hereinafter described with reference to Figs. 5 and 6. Leading into the well 5 from each chamber 9 through the adjacent wall 6 is a passage 11 which may be lined by a casing 12 carrying at the end within the well a lever 13 in turn carrying a sluice gate 14. This lever 13 is connected by a link or rod 15 to one end of a hand lever 16 pivoted on a bracket 17 near the top of the well 6 provided with the overhang 7, and the lever 16 may be manipulated to open the gate 14 at will, but when the lever is upright it is so pivoted in the bracket 17 and is so related to the link 15 that the said link 15, the lever 13 and the gate 14 are locked against any head of water within the respective chamber 9 tending to open the gate. When the lever 16 is laid down upon the overhang 7 the gate 14 is moved to the open position, and the corresponding chamber 9 has free access to the well 5.

It will be understood that in cases where the walls are made of concrete cement, such reinforcing as is found to be advisable will be employed, but as this is a common practice no further mention need be made of it. Where it becomes advisable because of the nature of the banks of the stream, sheet piling 18, shown in Fig. 2, may be employed.

Leading from the well is a pump suction pipe 19 having a branch 20 extending down into the well for an appropriate distance and provided with a foot valve 21 and continued from the pipe 19 is a by-pass 22 having a continuation 23 leading to an appropriate depth in the well for purposes of washing the filter bed, as will hereinafter appear.

In the structure shown in Fig. 1 and associated figures, the flooring 10 sustains pipes 24 preferably of rectangular cross section and of appropriate length, say about two feet. These pipes are preferably of terra cotta of commercial size and length such as are commonly employed for smoke flues or other purposes and are placed in the space bounded by the walls 2 and 3 and the corresponding wall 6 of the well 5, so that the space is divided into a large number of wells of rectangular, preferably square, cross section and of about two feet in depth. The square pipe sections adapt themselves to corner contact so that not only are cells inclosed by the four walls of the pipe, but the adjacent walls of four adjoining pipes define a cell except where the pipes are next to the retaining walls of the filter bed, in which case a cell is formed by three adjoining pipes and the corresponding portion of the retaining wall. By this means a minimum number of pipes will form a maximum number of cells within a given area. Extending through the flooring in position to communicate with the bottom of each pipe or space between pipes constituting a filter cell is a hole 25 opening into the corresponding chamber 9 and located as close as may be to the center of the filter cell. Each pipe 24 or space inclosed by adjacent pipes is filled with filtering material, such as graded layers of crushed stone or gravel, say from about one-half inch down, and finishing with sand or pulverized stone of suitable fineness or coarseness, each to an appropriate depth. Good results are obtained by first placing in the bottom of the filter cell a strainer 26 having a marginal supporting flange, which will raise the strainer a short distance above the corresponding hole 25. On this strainer there is deposited a layer 27 of stone of appropriate size and to a depth about four inches. Upon this there is produced another layer 28 of stone of smaller size to a like depth, and upon the second layer there is produced a third layer 29 of still smaller size, while the remainder of the depth of the cell is filled with sand or pulverized stone 30, such as will pass through say number eight on a number twenty screen. This arrangement is illustrated in Fig. 4 but the invention is not confined to any strict conformity with such arrangement, although under certain conditions it has been found to give excellent results but different conditions of course require different filtering materials or arrangements thereof. There is a liability of the formation of larger interstices between the walls of the cells and the adjacent filtering material than elsewhere in the cells and the partially filtered water may find a path through the cell at such points. To avoid this the cells may be lined with sand by coating them with a layer of thin cement and applying dry sand, thus producing a thin adherent layer of sand with which the filtering material will interlock. This coating is indicated at 30ª in Fig. 4.

Bolts 31 are sunk in the down stream wall 3 and serve to maintain brackets 32 fast to said wall, these brackets extending beyond the down stream edge of the wall. Mounted in these brackets is a shaft 33 carrying a suitable number of rock arms 34 fast thereto, and these rock arms terminate at the ends remote from the shaft in flanges 35 to which is attached a gate or tail board 36 of a length to extend from the wall 2 to that wall 6 of the well 5 provided with the overhang 7. A lever 37 fast to the shaft 33 adjacent the wall constitutes a convenient means for manipulating the gate or tail board 36 to place it in the path of a stream of water overflowing the filter bed, or to lift it out of the path of such stream.

In place of providing a wooden support for the filter units a base therefor may be constructed of tile members 38 shown in Fig. 5, and these members have holes 39 therein corresponding to the holes 25 in the flooring 10. The tile members 38 may be comparatively narrow and extend laterally of the direction of flow of the stream to the well 5, but where the sluice passages 11 are provided the corresponding wall of the well may have the passages therethrough expanded as indicated at 40 in Fig. 6, so as to include an appropriate number of the tile ducts 38 corresponding to the chambers 9 in the structure of the other figures.

Under some circumstances it may be desirable to use pipes of round cross section for the filter units, and such pipes are shown at 41 in Fig. 7 and the waste spaces between these pipes may be filled with cement grouting or with other material. Of course, the invention is not confined to the use of either square or round pipes for the filter units, but either of these forms are commercial forms and readily obtainable, while the square form has the advantage of giving the maximum filter area within a minimum inclosure.

While only one filter bed inclosure is shown in the drawings, it will be understood that any desired number of such filter beds may be arranged in series in the stream and each filter bed may be of any desirable area, depending upon the particular conditions present in the location where the filter bed is installed.

Suppose that a stream of water is flowing over the filter bed, the water will sink through the filtering layers in each filter unit and find its way through the holes 25 or 39 as the case may be, into the chambers 9 or tile base members 38, and this water already freed from sand, mud, and other undesirable material, and sensibly free from all deleterious material removable by a sand filter bed, finds its way into the well 5 from which the clean water may be withdrawn by any suitable pumping apparatus, not shown, through the pipe 19, and this pipe 19 may be taken as indicative of a suitable pumping apparatus. The flow of water from the filter beds into the well 5 depends upon the opening of the gates 14, and if all these gates be open the filter bed is operating to its full capacity, but the amount of filter bed in action may be reduced as desired by closing an appropriate number of the gates 14. Should it transpire that for any reason the flow of water in the stream is less than usual, the depth of water over the filter bed may be restored by placing the gate or tail board 36 into the path of the stream, so that the water is dammed back and its depth maintained by the tail board or tail gate to the desired point, while surplus water overflows this tail gate and continues on down stream. The water within the well will naturally assume a level about that of the running stream unless an attempt should be made to withdraw water from the well faster than it can flow thereinto.

In the course of time the filter bed will become more or less choked by a deposit of sand or mud, and then it is desirable to cleanse the filter bed. This may be accomplished by causing water to flow into the well through the pipe 19, either from the reservoir into which the filtered water has been pumped or from any other appropriate source, the foot valve under such circumstances closing and the by-pass valve 22 opening, and with the gates 14 open the clean water will flow into the chambers 9 or other underlying receptacles and in small streams up through the holes or passages 25 or 39, as the case may be, into the filtering material, and out through the top of the filter cells, thus lifting the mud or sand or other accumulated material when the running stream which then is unimpeded, since under these circumstances the tail gate 36 is raised, will wash away the accumulations thus disturbed and raised by the reverse flow of water through the filter beds. The force of the cleansing water will depend upon the head established within the well 5, and this head may be as great as the depth of the well by closing all the gates 14 until the water head is established, and then by opening the gates the water will flow backwardly through the filter cells to cause their cleansing. Each installation has numerous gates 14 and in order to provide for the maintenance of the level of cleansing water in the well by the pipe 19 only one or a small number of the gates are opened at a time, so that there may be no material diminution of the desired back-washing head and ultimately the entire filter beds may by this means be thoroughly cleansed. The upward flow of water agitates the filtering material, but since the single small opening in the bottom of each filtering cell is susceptible of calibration the washing action may be so regulated that it is impossible to displace or wash away the filtering material in any particular cell, although each and every cell gets a definite washing action through its individual supply aperture for passage from the suction well is made much larger than the aggregate size of the number of apertures or holes through the floor of the filter bed. By providing each filter unit or cell with a single aperture, it becomes an easy matter to calibrate or size such apertures according to conditions, so that with the desired pressure for back-washing, the proper quantity of water will be discharged from the suction well through each individual container. There is no danger of displacement or loss of filtering material by the washing water seeping and discharging through the softest spots in the filter bed, as tends to occur in filters of the ordinary type with the common sand bed.

By the present invention it will be observed that the filter bed is made up of a multitude of small units or cells each of which extends to the point over which the running water flows, so that there is established at such point a definite bottom for the running stream, whereby the filter bed is to a large extent self cleansing for the same reason that a reef or rock lying across the stream is usually kept clean by the natural action of the water, and, moreover, the tiles or containers for the filtering material make it impossible for freshets or other unusual conditions to wash away the filtering material.

What is claimed is:—

1. A filter bed having numerous upright containers for filtering material, a support for the containers having a relatively small aperture or hole therethrough for each container, and a well common to all the containers and communicating with each container through said relatively small aperture.

2. A filter bed having numerous upright containers for filtering material, a support for the containers having a relatively small aperture or hole therethrough for each container, and a well common to all the containers and communicating with each container through said relatively small aperture, said well extending to a greater height than the top of the filter bed and provided with means for extracting water therefrom or delivering water thereinto at will.

3. A filter system for use in running streams comprising a group of filter units each designed to contain filtering material, a support for the filter units sunk in the bed of the stream to a distance to bring the tops of the filter units substantially level with the bottom of the stream, ducts leading from the bottoms of the filter units, and a well rising to a greater height than the level of the stream and to the depth of the ducts and communicating therewith, said well being provided with controlling means for the ducts for placing one or more of said ducts in communication with the well at will.

4. A filter system for use in running streams comprising a group of filter units each designed to contain filtering material, a support for the filter units sunk in the bed of the stream to a distance to bring the tops of the filter units substantially level with the bottom of the stream, ducts leading from the bottoms of the filter units, and a well rising to a greater height than the level of the stream and to the depth of the ducts and communicating therewith, said well being provided with controlling means for the ducts for placing one or more of said ducts in communication with the well at will, each filter unit having a single relatively small aperture for communication with a respective duct and the well being provided with means for removing filtered water therefrom or supplying water thereto from another source than the filter bed.

5. A filter plant for installation in running streams comprising a pit sunk in the bed of a stream with the surface of the pit substantially on a level with the bottom of the stream, a well at one end of the pit rising to a height greater than the level of the stream and communicating with the pit near the lower end thereof, a base or support within the pit and having chambers or channels extending to the well, sluice gates for controlling communication between the pit and the well by way of the channels or chambers, and filter units lodged in the pit to substantially the capacity thereof, each filter unit being adapted to contain filtering material and of a height to extend to the top of the pit to a point substantially coincident with the bottom of the stream.

6. A filter plant for installation in running streams comprising a pit sunk in the bed of a stream with the surface of the pit substantially on a level with the bottom of the stream, a well at one end of the pit rising to a height greater than the level of the stream and communicating with the pit near the lower end thereof, a base or support within the pit having chambers or channels extending to the well, sluice gates for controlling communication between the pit and the well by way of the channels or chambers, and filter units lodged in the pit to substantially the capacity thereof, each filter unit being adapted to contain filtering material and of a height to extend to the top of the pit to a point substantially coincident with the bottom of the stream, and a tail gate associated with the pit structure for increasing the effective height thereof at its down stream end.

7. A filter plant for installation in running streams comprising a pit sunk in the bed of a stream with the surface of the pit substantially on a level with the bottom of the stream, a well at one end of the pit rising to a height greater than the level of the stream and communicating with the pit near the lower end thereof, a base or support within the pit having chambers or channels extending to the well, sluice gates for controlling communication between the pit and the well by way of the channels or chambers, and filter units lodged in the pit to substantially the capacity thereof, each filter unit being adapted to contain filtering material and of a height to extend to the top of the pit to a point substantially coincident with the bottom of the stream, said well being provided with means for removing filtered water therefrom and with means for supplying water thereto from a source other than the filter bed.

8. A filter plant for installation in running streams comprising a pit sunk in the bed of a stream with the surface of the pit substantially on a level with the bottom of the stream, a well at one end of the pit rising to a height greater than the level of the stream and communicating with the pit near the lower end thereof, a base or support within the pit having chambers or channels extending to the well, sluice gates for controlling communication between the pit and the well by way of the channels or chambers, and filter units lodged in the pit to substantially the capacity thereof, each filter unit being adapted to contain filtering material and of a height to extend to the top of the pit to a point substantially coincident with the bottom of the stream, and a tail gate associated with the pit structure for increasing the effective height thereof at its down stream end, said well being provided with means for removing filtered water therefrom and with means for supplying water thereto from a source other than the filter bed.

9. A filter bed comprising a plurality of upright filter units adapted to contain loose filtering material, each filtering unit having at its lower end an outlet of relatively small area.

10. A filter bed having chambers formed in its lower portion and with spaced apertures of relatively small size through the top walls of the chambers, and a plurality of filter units composed of containers of rectangular cross section open at the ends and supported upright by the top wall of the chambers, said containers being in corner engagement to define cells for filtering material within the walls of the containers and exterior to said containers.

11. A filter plant comprising a walled pit formed in the bed of a stream of water with the top of the pit substantially coincident with the bottom of the running stream, a well formed at one end of the pit in communication therewith, and a series of individual containers lodged in the pit in substantially upright position with the upper ends substantially flush with the top of the pit and the lower ends elevated above the bottom of the pit.

12. A filter plant for use in connection with running streams comprising a walled pit open at the upper end and sunk in the bed of the stream to a point approximately flush with the bottom of the stream, a well at one end of the pit communicating at the bottom portion with the bottom portion of the interior of the pit and rising to a greater height than the high water level of the stream, and upright filter units having their tops approximately level with the top of the pit and their lower ends elevated above the bottom of the pit in communication with the well through the bottom portion of the pit.

13. A filter plant for use in connection with running streams comprising a walled pit open at the upper end and sunk in the bed of the stream to a point approximately flush with the bottom of the stream, a well at one end of the pit communicating at the bottom portion with the bottom portion of the interior of the pit and rising to a greater height than the high water level of the stream, and upright filter units having their tops approximately level with the top of the pit and their lower ends elevated above the bottom of the pit in communication with the well through the bottom portion of the pit, said well being provided with controllable means for determining the number of filter units to be active at any one time.

14. In a filter plant for use in running streams, a pit sunk in the bed of the stream with its upper end open and substantially coincident with the bottom of the stream, a well communicating with one end of the pit and rising to a height above the high water level of the stream, a plurality of sluice gates between the pit and the well with accessible means for controlling the opening and closing of the sluice gates, means for removing filtered water from the well or supplying water thereto from another source than the pit at will, a plurality of upright containers lodged in the pit and substantially filling the same with their upper ends substantially coincident with the top of the pit and their lower ends elevated above the bottom of the pit, said containers having a support in the pit above the bottom thereof with apertures through the support, the aggregate area of the apertures being relatively small as compared with the cross sectional area of the containers and the capacity of the pit below the containers, said containers being adapted to receive fitering material.

15. A filter plant for running streams, comprising a pit sunk in the bed of the stream and open at the upper end substantially flush with the bottom of the stream, and filter units each provided with loose filtering material, said units being upright in position in the pit and substantially filling the same, and having their upper ends substantially flush with the top of the pit.

16. A filter plant for running streams comprising a filter bed sunk in the bed of the stream with its upper edge substantially coincident with the bottom of the stream, and a tail gate or board at the down stream end of the filter bed movable into and out of the path of the running water to maintain the height of the water above the filter bed under low water conditions.

In testimony that I claim the foregoing as my own, I have hereto affixed my signature in the presence of two witnesses.

EDGAR CLARENCE WILEY.

Witnesses:
ALICE L. KREBLES,
GRACE H. MAHOOD.